UNITED STATES PATENT OFFICE.

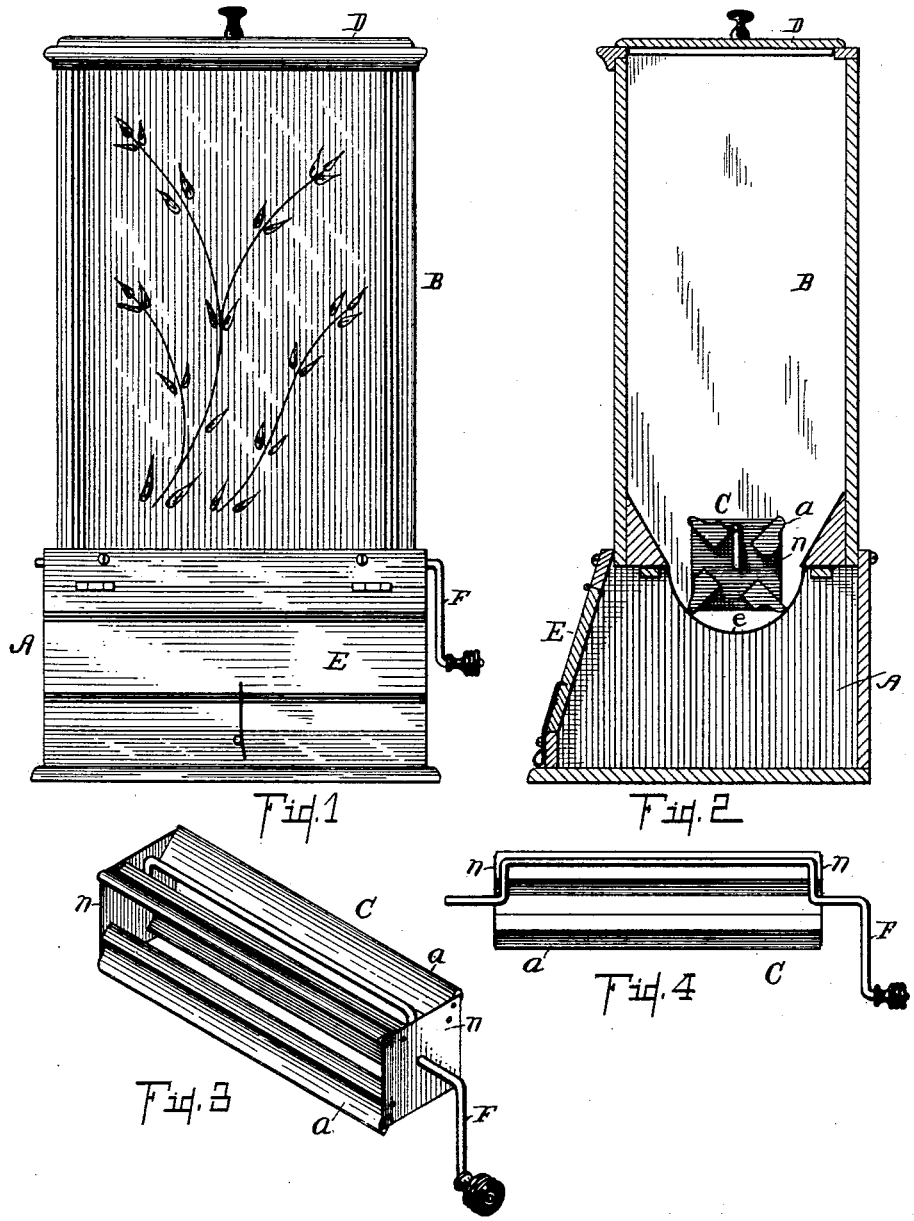

BYRON D. COOK, OF HOMER, MICHIGAN, ASSIGNOR TO P. C. MITCHELL, OF SAME PLACE.

FLOUR BIN AND SIFTER.

SPECIFICATION forming part of Letters Patent No. 593,350, dated November 9, 1897.

Application filed April 13, 1896. Serial No. 587,397. (No model.)

*To all whom it may concern:*

Be it known that I, BYRON D. COOK, a citizen of the United States, residing at the village of Homer, in the county of Calhoun, in the State of Michigan, have invented a certain new and useful Improvement in Flour Bins and Sifters, of which the following is a specification.

My invention relates to improvements in flour bins and sifters and articles for similar use, and is an improvement on the construction shown in Patent No. 516,367, issued March 13, 1894, to W. H. and B. D. Cook.

The objects of my invention are, first, to provide a flour-bin very simple in its construction; second, to provide an improved sifting-reel which retains its form perfectly, serves as a support to the main body of the flour or meal above, and permits a sufficient quantity to drop upon the sieve to secure the best results of the sifter; third, to provide improved means of jarring or shaking the reel, and further objects appearing in the detailed description. I accomplish these objects by the devices and means described in the following specification and illustrated in the accompanying drawings, in which—

Figure 1 is a front elevation of a flour bin and sifter embodying my invention. Fig. 2 is a vertical sectional elevation from front to rear of the bin as shown in Fig. 1. Fig. 3 is an enlarged detail perspective view of the reel removed from the bin. Fig. 4 is a vertical longitudinal section through the reel, showing the formation of its crank and shaft.

Similar letters of reference refer to similar parts throughout the several views.

Referring to the lettered parts of the drawings, A represents the hollow base, which receives the sifted flour or meal. This has a hinged door E in front for access to the sifted meal within. Above this base is supported the main body of the chest B, which projects down inside of the base A and is secured rigidly thereto by suitable screws or nails. A removable cover D is provided for the top. A sieve $e$, conformed to the surface of a cylinder, is supported in the bottom of the body B, and where the body B is large the front and rear surfaces of the walls are sloped to discharge the flour into the sieve. Supported on the top of the base A is the reel C on its wire axis. The reel is made up of four strips of ogee molding $a$, which are securely nailed to end strips $n$ of sheet metal, so that the outer edges of the molding will swing in the surface of a cylinder having its axis through the center of the plates $n$. A rod F, forming a crank at its outer end, extends through the plates $n$ $n$ to form the axis of the reel, and is offset on the reel to contact with the bars or strips of molding $a$ to form a convenient shaft for rotating the same, and also serve as a convenient shaker or jarring device to free the reel from flour and jar it down from above. The manner of supporting the strips $a$ by a metal plate at the end is necessary, for the reason that when the reel is made entirely of wood the different degrees of moisture to which it is subjected causes the wood to expand and contract and warp, which interferes greatly with its operation. This is obviated because the moisture does not attack the metal plate at the end, and therefore the reel always runs even over the sieve.

Having thus described my improved bin and sifter, I desire to call attention to the fact that the reel constructed as I have here indicated serves as a support for the main body of the flour above and at the same time allows a quantity of the flour to drop down through the reel upon the sieve, where it can be forced through into the hollow base below.

The construction of the reel can be somewhat varied without departing from my invention, though it should have the wooden float for lightness and strength and the metal end to support the same without warping or swelling.

Having thus described my invention, what I claim as new, and desire to secure by Letters Patent, is—

1. In a combined flour bin and sifter, the combination of the hollow base A, with the door E, to the front thereof; the main bin B, above; a curved screen E, between the upper main portion and the base; a reel supported above the curved sieve consisting of strips of molding $a$, held between suitable metal end plates $n$, with a crank and shaft F, having an offset portion to support and jar the same all coacting together for the purpose specified.

2. In a flour or meal sifter the combination of the curved sieve $e$; the reel supported within said sieve consisting of the metal end plates $n$; strips of molding $a$, nailed between the two, and a crank-rod forming a crank F, extending through the end plates $n$, and offset to engage the bars of molding $a$ to rotate and jar the same, as specified.

In witness whereof I have hereunto set my hand and seal in the presence of two witnesses.

BYRON D. COOK. [L. S.]

Witnesses:
ALBERT E. ROBINSON,
GEO. A. MCCARTNEY.